US011952287B2

(12) United States Patent
Kollin et al.

(10) Patent No.: US 11,952,287 B2
(45) Date of Patent: Apr. 9, 2024

(54) METHOD FOR THE PRECIPITATION OF PARTICLES OF A METAL CARBONATE MATERIAL WITHOUT USE OF A CHELATING AGENT

(71) Applicant: HALDOR TOPSØE A/S, Kgs. Lyngby (DK)

(72) Inventors: Line Holten Kollin, Brønshøj (DK); Rainer Küngas, Copenhagen S (DK); Steen Henrik Olsen, Gentofte (DK); Anni Stahl, Lynge (DK); Søren Dahl, Hillerød (DK)

(73) Assignee: HALDOR TOPSØE A/S, Kgs. Lyngby (DK)

( * ) Notice: Subject to any disclaimer, the term of this patent is extended or adjusted under 35 U.S.C. 154(b) by 1033 days.

(21) Appl. No.: 16/317,981

(22) PCT Filed: Jul. 11, 2017

(86) PCT No.: PCT/EP2017/067360
§ 371 (c)(1),
(2) Date: Jan. 15, 2019

(87) PCT Pub. No.: WO2018/015207
PCT Pub. Date: Jan. 25, 2018

(65) Prior Publication Data

US 2021/0300780 A1 Sep. 30, 2021

(30) Foreign Application Priority Data

Jul. 20, 2016 (DK) ........................... PA 2016 00434

(51) Int. Cl.
*C01G 53/06* (2006.01)
*B01J 19/18* (2006.01)
(Continued)

(52) U.S. Cl.
CPC .......... *C01G 53/06* (2013.01); *B01J 19/1862* (2013.01); *C01G 53/006* (2013.01);
(Continued)

(58) Field of Classification Search
CPC .............................. C01G 53/06; C01G 53/006
See application file for complete search history.

(56) References Cited

U.S. PATENT DOCUMENTS 8,404,381 B2 3/2013 Jouanneau et al.
2006/0105239 A1 5/2006 Paulsen et al.
(Continued)

FOREIGN PATENT DOCUMENTS

CN 101483238 A 7/2009
CN 102569773 A 7/2012
(Continued)

OTHER PUBLICATIONS

Office Action (The Second Office Action) dated Jun. 11, 2021, by the China National Intellectual Property Administration in corresponding Chinese Patent Application No. 2017800421500, and an English Translation of the Office Action. (16 pages).
(Continued)

*Primary Examiner* — Peter F Godenschwager
(74) *Attorney, Agent, or Firm* — Boone IP Law

(57) ABSTRACT

In a method for the precipitation of particles of a metal carbonate material comprising nickel and manganese in an atomic ratio of 0≤Ni:Mn≤1:3, aqueous solutions comprising sulfates or nitrates of nickel and manganese are mixed with aqueous solutions of carbonates or mixtures of carbonates and hydroxides of sodium or potassium in a stirred reactor at pH>7.5 without the use of a chelating agent. Thereby
(Continued)

agglomerated particles are formed without any subsequent process steps, in particular no subsequent process at temperatures higher than the precipitation temperature.

13 Claims, 2 Drawing Sheets

(51) Int. Cl.

| | |
|---|---|
| ***C01G 53/00*** | (2006.01) |
| ***H01M 4/02*** | (2006.01) |
| ***H01M 4/505*** | (2010.01) |
| ***H01M 4/525*** | (2010.01) |
| ***H01M 10/0525*** | (2010.01) |

(52) U.S. Cl.

CPC ...... *C01P 2002/72* (2013.01); *C01P 2004/32* (2013.01); *C01P 2004/50* (2013.01); *C01P 2004/51* (2013.01); *C01P 2004/61* (2013.01); *C01P 2006/40* (2013.01); *H01M 2004/028* (2013.01); *H01M 4/505* (2013.01); *H01M 4/525* (2013.01); *H01M 10/0525* (2013.01)

(56) References Cited

U.S. PATENT DOCUMENTS

| | | | |
|---|---|---|---|
| 2014/0341797 | A1 | 11/2014 | Krumdick et al. |
| 2015/0041710 | A1 | 2/2015 | Sun et al. |
| 2015/0318538 | A1 | 11/2015 | Sakai et al. |

FOREIGN PATENT DOCUMENTS

| | | | |
|---|---|---|---|
| CN | 102931394 | A | 2/2013 |
| CN | 103332754 | A | 10/2013 |
| CN | 103682323 | A | 3/2014 |
| CN | 103746110 | A | 4/2014 |
| CN | 104112845 | A | 10/2014 |
| EP | 1652819 | A1 | 5/2006 |

OTHER PUBLICATIONS

Danish Search Report dated Jan. 16, 2017.

International Search Report (PCT/ISA/210) dated Sep. 21, 2017, by the European Patent Office as the International Searching Authority for International Application No. PCT/EP2017/067360.

Written Opinion (PCT/ISA/237) dated Sep. 21, 2017, by the European Patent Office as the International Searching Authority for International Application No. PCT/EP2017/067360.

METHOD FOR THE PRECIPITATION OF PARTICLES OF A METAL CARBONATE MATERIAL WITHOUT USE OF A CHELATING AGENT

The present invention relates to a novel method for the precipitation of particles of a metal carbonate material comprising nickel and manganese.

Limited oil reserves together with an increasing effort to reduce the amount of $CO_2$ emission not only cause a shift in electric energy production towards renewable forms of energy, but also result in increasing research for alternative drive trains in the automotive industry. Moreover, an increasing demand for durable high power storage media within consumer electronics and telecommunication promotes both improvement of existing energy storage systems and development of new energy storage systems with the main focus on efficiency, cost reduction and safety. Due to its high gravimetric energy storage capability, the lithium ion battery (LiB) is a promising system, not only for today and future energy storage, but also for use in automobiles and in a large variety of other special fields of application.

The first commercialized LiB was based on $LiCoO_2$ as positive electrode and graphite as negative electrode, delivering an average potential of 3.8 V vs. $Li/Li^+$. However, since cobalt is both relatively expensive and toxic, the search for alternative cathode materials is ongoing, and an increasing number of other material combinations are being tested and partially commercialized. One possibility to increase the energy density of the LiB lies in raising the operating voltage of the cells. This could be achieved by using cathode materials with higher electrode potential like the $LiNi_{0.5}Mn_{1.5}O_4$ spinel, delivering a voltage of 4.7 V vs. $Li/Li^+$.

DETAILED DESCRIPTION

Figure 1:
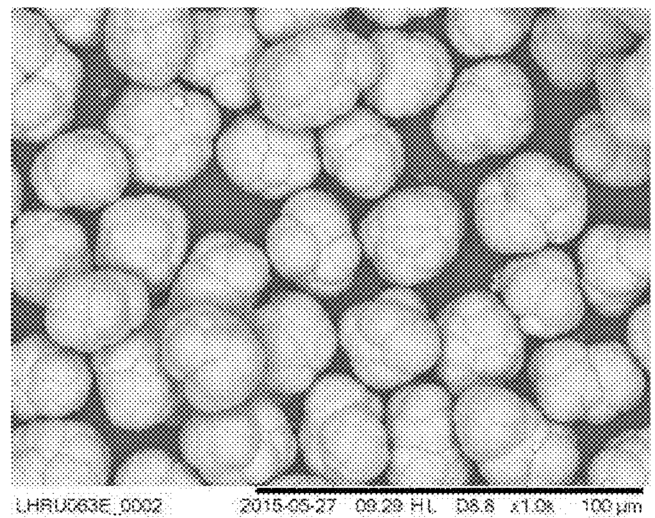
FIG. 1 shows $Ni_{0.5}Mn_{1.5}(CO_3)_2$ particles made using a method according to the disclosure.

A spinel means a crystal lattice where the oxide anions are arranged in a cubic close-packed lattice and the cations are occupying some or all of the octahedral and tetrahedral sites in this lattice. The symmetry of the spinel lattice is described by space groups of $P4_332$ for the ordered phase and Fd-3m for the disordered phase. The spinel material may be a single disordered or ordered phase, or a mix of both (Adv. Mater., 24 (2012), pp 2109-2116).

Another important factor for the choice of materials in the LiB is the abundance of their components in the earth crust securing long term availability and cost reduction, due to which materials based on iron and manganese are of great interest. Especially manganese oxides constitute a promising group of cathode materials, because manganese is a low priced and non-toxic element. In addition, manganese oxides have a rather high electronic conductivity together with a suitable electrode potential. Among the lithium manganese oxides, the layered $LiMnO_2$ and the spinel-type $LiMn_2O_4$ (LMO) are the most prominent ternary phases. Advantages of the latter one in comparison to the layered phase are a higher potential of about 4.0 V against $Li/Li^+$, whereas $LiMnO_2$ delivers only 3.0 V. The $LiMn_2O_4$ lattice offers three-dimensional lithium diffusion, resulting in a faster uptake and release of this ion. The diffusion of $Li^+$ in doped LMO spinels is also equally fast in all three dimensions.

Among the transition metal doped $LiMn_2O_4$ spinel electrodes, $LiNi_yMn_{2-y}O_4$, $0<y\leq0.5$, is a very promising material: It has a relatively high voltage of 4.7 V vs. $Li/Li^+$ due to the electrochemical activity of the $Ni^{2+}/Ni^{4+}$ redox couple. $LiNi_{0.5}Mn_{1.5}O_4$ has a theoretical specific capacity of 147 mAh/g and therefore an attractive theoretical energy density of about 4.7 V·147 Ah/kg=691 Wh/kg active material, referring to lithium metal. By replacing 25% of the manganese ions with nickel, there is in theory no $Mn^{3+}$ left in the structure. For charge balance reasons, the $Ni^{2+}$ incorporation forces all manganese ions to their tetravalent state. If the less than 25% of the manganese is replaced by Ni, some $Mn^{3+}$ will be left in the structure. For $LiNi_yMn_{2-y}O_4$ the theoretical $Mn^{3+}:Mn^{4+}$ ratio is equal to (0.5−y). It should be noticed that in practice there will often be small deviations from the theoretical composition and average oxidation states when synthesizing a material. This can occur because of deviation from the exact stoichiometry due to either the existence of defects and inhomogeneity in the structure of $LiNi_yMn_{2-y}O_4$ or the existence of impurity phases which alter the composition of the main phase. It is for instance well known that small amounts of a rock salt phase are present when synthesizing $LiNi_{0.5}Mn_{1.5}O_4$, which affects the stoichiometry of the spinel phase and renders the total material oxygen deficient (J. Cabana et al., *Chemistry of Materials* 24 (2012), 2952).

LNMO materials are lithium positive electrode active materials of the above formula, which more specifically may be characterised by the general formula $Li_xNi_yMn_{2-y}O_4$ with typical x and y values of $0.9\leq x\leq1.1$ and $0.4\leq y\leq0.5$, respectively. The formula represents the composition of the spinel phase of the material. Such materials may be used for e.g. portable electric equipment (U.S. Pat. No. 8,404,381 B2), electric vehicles, energy storage systems, auxiliary power units (APU) and uninterruptible power supplies (UPS). Lithium positive electrode active materials based on LNMO are seen as prospective successors to current lithium secondary battery cathode materials such as $LiCoO_2$ due to their high voltage and high energy density, coupled with lower raw materials costs.

In addition to the elemental composition and crystal structure of the electrode materials, it is well known to those skilled in the art that control of the shape and microstructure of the particles is vital, if batteries with good cycling behaviour and high performance are desired. For example, Zhu et al. (*Solid State Ionics,* 179 (2008) 1788) showed that powder morphology had a significant impact on the electrochemical performance of LMO spinel when tested in half cells where Li metal was used as the anode. In particular, spherical LMO particles were found to have significantly higher capacity retention after 100 cycles of charge-discharge than irregularly shaped particles. According to the authors, increased performance was due to reduced stress on particles during cycling, because the local Jahn-Teller distortions on one side of the spherical particle were counteracted by identical distortions on the opposite side of the particle.

One way to quantify the size of particles in a slurry or a powder is to measure the size of a large number of particles and calculate the characteristic particle size as a weighted mean of all measurements. Another way to characterize the size of particles is to plot the entire particle size distribution, i.e. the volume fraction of particles with a certain size as a function of the particle size. In such a distribution, D10 is defined as the particle size where 10% of the population lies below the value of D10, D50 is defined as the particle size where 50% of the population lies below the value of D50 (i.e. the median), and D90 is defined as the particle size where 90% of the population lies below the value of D90. Commonly used methods for determining particle size distributions include dynamic light scattering measurements and scanning electron microscopy measurements, coupled with image analysis.

Similarly, there are several ways to characterize and quantify the sphericity and shape of particles. Almeida-Prieto et al. in *J. Pharmaceutical Sci.,* 93 (2004) 621, lists a number of form factors that have been proposed in the literature for the evaluation of sphericity: Heywood factors, aspect ratio, roughness, pellips, rectang, modelx, elongation, circularity, roundness, and the Vp and Vr factors proposed in the paper. Circularity of a particle is defined as $4\cdot\pi\cdot(\text{Area})/(\text{Perimeter})^2$. An ideal spherical particle will thus have a circularity of 1, while particles with other shapes will have circularity values between 0 and 1.

Particle shape can further be characterized using aspect ratio, defined as the ratio of particle length to particle breadth, where length is the maximum distance between two points on the perimeter and breadth is the maximum distance between two perimeter points linked by a line perpendicular to length.

For most battery applications, space is at a premium, and high energy density is desired. Powders of the electrode material with a high tap density tend to result in electrodes with higher active material loading (and thus higher energy density) than powders with a low tap density. It can be shown using geometry-based arguments that materials composed of spherical particles have a higher theoretical tap density than particles with irregular shapes.

In addition to the shape of the spinel particles, the surface microstructure and roughness are thought to play a key role in determining the cycling behaviour and rate-capability of high-voltage electrode materials, such as LNMO, in batteries. The redox potential of the $Ni^{2+}/Ni^{4+}$ redox couple in LNMO lies at approximately 4.7 V vs. $Li/Li^+$, which is higher than the stability limit of common liquid carbonate-based electrolytes (typically between 4.0 and 4.3 V). This leads to the oxidation of the electrolyte on the positive electrode during battery operation, and to the formation of a resistive cathode/electrolyte interface layer on the electrode. The rougher the surface of the active powder in the electrode (i.e. the higher its specific surface area), the more of the electrolyte is lost due to oxidation and the formation of the cathode/electrolyte interface layer. Therefore, positive electrode active materials with low specific surface area (i.e. smooth and non-porous surface morphology) are required to avoid capacity fading during long-term battery operation.

Lithium positive electrode active materials may be prepared from precursors obtained by mechanically mixing starting materials to form a homogenous mixture, followed by calcination. For example, in U.S. Pat. No. 8,404,381 B2, an intimate mixture of nickel carbonate, manganese carbonate, and lithium carbonate is prepared by grinding in the presence of hexane. The mixture is dried and treated at 600° C. (10 hours), and then at 900° C. (15 hours) to form LNMO. Critically, LNMO materials prepared according to this method will not be spherical, which will have a significant negative effect on the cycling behaviour of the battery using such LNMO as positive electrode, as well as on the tap density of the LNMO powder.

Another way to prepare positive electrode active materials for LiB is to use the method of precipitation, followed by calcination/lithiation. In precipitation, two or more solutions are mixed under controlled conditions and react to form an insoluble product, which can then be isolated from the rest of the mixture. When precipitation is used for battery material synthesis, the process typically starts with the precipitation of the transition metal species in the desired elemental ratio. Examples of such transition metal species include but are not limited to $Ni(OH)_2$, Ni—$CO_3$, $Ni_2CO_3(OH)_2$, $Ni(HCO_3)_2$, $Ni_3CO_3(OH)_4$, $Mn(OH)_2$, $MnCO_3$, $Ni_{0.25}Mn_{0.75}(OH)_2$, $Ni_{0.25}Mn_{0.75}CO_3$, $Ni_{0.5}Mn_{0.5}(OH)_2$, $Ni_{0.5}Mn_{0.5}CO_3$, $Ni_{1/3}Mn_{1/3}CO_{1/3}(OH)_2$ and $Ni_{1/3}Mn_{1/3}Co_{1/3}CO_3$. Such transition metal hydroxides, carbonates, or hydroxycarbonates are often referred to as precursor materials. After precursor materials are obtained, they are typically mixed with a Li-containing material and calcined to elevated temperatures to ensure the formation of the correct crystallographic phase. The Li-containing material includes, but is not limited to lithium hydroxide, lithium carbonate, or lithium nitrate. It is generally accepted that the shape and size of the powder particles of the final active material are to a great extent determined by the morphology and size of the precursor particles. Importantly, when reaction parameters are properly controlled, spherical precipitate particles can be obtained.

One way of preparing precursor materials for LNMO-type LiB positive electrode materials is to precipitate the mixture of Ni and Mn as hydroxides, i.e. $Ni_yMn_{2-y}(OH)_4$, where $0 \leq y \leq 0.5$. Such precipitation commonly uses the corresponding transition metal sulfates and NaOH as starting materials and ammonia ($NH_3$, $NH_4OH$ or $NH_3 \cdot H_2O$) as chelating agent. Other commonly used chelating agents include, but are not limited to $NH_4CO_3$, citric acid, glycolic acid, oxalic acid, polyacrylic acid, malonic acid, and EDTA.

In van Bommel et al., *Chem. Mater.* 21, (2009) 1500, a general scheme for the reactions occurring in a hydroxide-based precipitation process employing ammonia is given as:

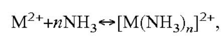

$$M^{2+} + nNH_3 \leftrightarrow [M(NH_3)_n]^{2+},$$

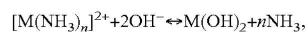

$$[M(NH_3)_n]^{2+} + 2OH^- \leftrightarrow M(OH)_2 + nNH_3,$$

where M stands for transition metal. The chelating agent is believed to have the function of inducing and controlling the growth of the precursor so that the desired morphology is obtained. Pu et al., *Journal of New Materials for Electrochemical Systems,* 8 (2005) 235 demonstrate that $Ni(OH)_2$ is an insoluble substance with a solubility product constant of $2.02 \cdot 10^{-15}$. According to the authors, this indicates that the nucleation process is relatively easy compared to the process of crystal growth. Obtaining spherical $Ni(OH)_2$ particles thus requires a chelating agent for the particles to grow.

The presence and concentration of ammonia in the hydroxide-based process is critical. As a chelating agent, ammonia plays an important role in improving particle uniformity, improving particle sphericity and suppressing phase separation in the hydroxide-based process. For example, Tang et al., *Pure Appl. Chem.,* 80 (2008) 2537, investigated the effect of ammonia to metal molar ratio in the preparation of $Ni_{1/3}Mn_{1/3}Co_{1/3}(OH)_2$ and found significant differences in particle morphology between samples prepared using ammonia to metal ratios of 0.5:1, 1:1, 1.5:1, and 2:1. They state that at low ammonia concentrations (such as 0.5:1), metal ions react immediately with $OH^-$ anions without being chelated, which leads to irregularly shaped particle agglomerates. In contrast, too high amounts of ammonia (such as 2:1) lead to excessive nucleation, and smaller and irregular particles. Only in the ammonia-to-metal ratio range between 1:1 and 1.5:1, spherical particles with a relatively narrow particle size distribution can be obtained. Other chelating agents can be reasonably expected to have a similar effect. Zhou et al., *Chem. Mater.*, 22 (2010) 1015 were investigating several different routes with and without ammonium hydroxide for the preparation of $Ni_xMn_{1-x}(OH)_2$ from nickel(II) nitrate hexahydrate, manganese nitrate tetrahydrate, sodium hydroxide and/or $LiOH \cdot H_2O$ as starting materials. Out of the four routes investigated, the formation of dense spherical $Ni_xMn_{1-x}(OH)_2$ particles was observed only in case ammonia was employed as chelating agent. According to the authors, this was due to the ammonia-induced dissolution-recrystallization process of the initially precipitated mixed hydroxide nanoparticles. They further state that in order to prepare dense and spherical $Ni_xMn_{1-x}(OH)_2$ particles, attention must be paid to the amount of oxygen the samples are exposed to during the process, and to the details of the ammonia content, temperature, and pH of the reaction.

Another way of preparing precursor materials for LNMO-type LiB positive electrode materials is to precipitate the mixture of Ni and Mn as carbonates, i.e. $Ni_yMn_{2-y}(CO_3)_2$, where $0 \leq y \leq 0.5$. Such precipitation commonly uses the corresponding transition metal sulfates and $Na_2CO_3$ as starting materials and ammonia ($NH_3$, $NH_4OH$ or $NH_3 \cdot H_2O$) as chelating agent. For example, in US 2014/0341797 A1, $NiSO_4$, $MnSO_4$, $Na_2CO_3$, and $NH_4OH$ are fed into a special reactor system at a molar flow rate of 3.25 mol/hr, 6.5 mol/hr, 10.8 mol/hr and 1.1 mol/hr. Spherical nickel manganese carbonate particles could be obtained, but only when the continuously stirred tank reactor was combined with centrifugal dispensers and particle size separators. The first disadvantage with the above process is that a complex reactor design is required to obtain spherical carbonate particles. The second disadvantage with the above process is that a chelating agent, in this case ammonia, is used.

US 2015/0041710 A1 relates to cathode active materials for lithium secondary batteries. More particularly it relates to a method for preparing 3V class spinel oxides with the composition $Li_{1+x}[M_yMn_{(2-y)}]O_{4-z}S_z$ ($0 \leq z \leq 0.1$; $0.01 \leq y \leq 0.5$ and $0.01 \leq z \leq 0.5$; M=Mn, Ni or Mg) by carbonate co-precipitation. Apart from a metal solution and a carbonate solution, ammonia as a chelating agent is also included in the precipitation step.

There are several disadvantages related to the use of chelating agents such as ammonia in the precipitation process. First, chelating agents form complexes with manganese and nickel ions, increasing the solubility of these metals in the solution. This means that more manganese and nickel will inevitably remain in solution during precipitation and thus, more starting material will have to be used to produce a certain amount of carbonate precursor compared to when no chelating agent is used. Secondly, since the chelating ability of the various chelating agents varies as a function of pH and temperature, the elemental composition and nickel-to-manganese ratio of the carbonate precipitate will also change as a function of pH and temperature, making the process more difficult to control. Thirdly, in a large-scale production facility, any used chelating agent needs to be recycled for environmental and economic reasons, typically via an ammonia stripping process, adding further complexity to the production process. Fourthly, the handling of some chelating agents, such as ammonia, is hazardous and costly. Fifthly, the use of volatile chelating agents, such as ammonia, requires the precipitation reaction to be carried out in a gas tight reactor system.

The present invention relates to a novel method for the precipitation of particles of a metal carbonate material comprising nickel and manganese in an atomic ratio of $0 \leq Ni:Mn \leq 1:3$, wherein aqueous solutions comprising sulfates of nickel and manganese or aqueous solutions comprising nitrates of nickel and manganese are mixed with aqueous solutions of sodium carbonate or potassium carbonate or mixtures of sodium carbonate and sodium hydroxide or mixtures of potassium carbonate and potassium hydroxide in a stirred reactor at pH>7.5 without the use of a chelating agent, thereby forming agglomerated particles without any subsequent process steps.

The present invention thus discloses a method for preparing precursor materials for LNMO-type LiB positive electrode materials by precipitating a mixture comprising nickel and manganese carbonates, e.g. $Ni_yMn_{2-y}(CO_3)_2$, where $0 \leq y \leq 0.5$, without the use of any chelating agents.

In the method of the invention, the agglomerated particles are formed by the mixing of the aqueous solutions comprising sulfates of nickel and manganese or aqueous solutions comprising nitrates of nickel and manganese are mixed with aqueous solutions of sodium carbonate or potassium carbonate or mixtures of sodium carbonate and sodium hydroxide or mixtures of potassium carbonate and potassium hydroxide. Thus, the method according to the invention ensures that the agglomerated particles are formed without any subsequent process steps. In particular, no further process steps at temperatures higher than the precipitation temperature are necessary in order to form or shape the particles. Such subsequent process steps could e.g. be aging at precipitation temperature, aging at an elevated temperature, spray drying or other appropriate process steps arranged to form the particles or alter the form of the particles. Further process steps may follow the method of the invention, such as washing the agglomerated particles. However, after the method of the invention, the carbonate particles have obtained their final shape and any further subsequent process steps after the method of the invention are not relevant to the shape of the carbonate particles. It should be noted, however, that subsequent steps, such as calcination, may change the shape of the particles somewhat; nonetheless, the important feature of the method of the invention is that the carbonate particles obtained thereby need not undergo further process steps in order to change their shape. It is preferred that the aqueous solutions comprising sulfates of nickel and manganese or aqueous solutions comprising nitrates of nickel and manganese are contained in a first vessel and that the aqueous solutions of sodium carbonate or potassium carbonate or mixtures of sodium carbonate and sodium hydroxide or mixtures of potassium carbonate and potassium hydroxide are contained in a second vessel, and that the mixing thereof takes place in a third vessel. In this case, the third vessel is a stirred reactor.

In an embodiment of the method according to the invention, aqueous solutions comprising sulfates of nickel and manganese or aqueous solutions comprising nitrates of nickel and manganese are mixed with aqueous solutions of sodium carbonate or potassium carbonate. The preferred agglomerated particles are characterized by an average circularity higher than 0.90 and simultaneously an average aspect ratio lower than 1.50, and they are essentially spherical.

The invention has the advantage that the solubility of manganese and nickel ions in the solution remains very low, as no metal ions are bound by the chelating agent. This means that less starting materials will have to be used to produce a certain amount of carbonate precursor compared to when chelating agent is used. The invention has the further advantage that the elemental composition of the formed carbonate precipitate is easier to control than when a chelating agent is used. The invention has another advantage in that relatively simple equipment, i.e. one that does not include facilities for chelating agent recycle, can be used for large-scale production. The invention has yet another advantage in that the hazardous and costly handling of chelating agents (notably ammonia) can be avoided. A further advantage of the invention, compared to when ammonia is used as chelating agent, is that the precipitation reaction can be carried out in open reactors without control of the gas atmosphere.

Based on results reported in the literature, chelating agents play an important role in the precipitation of LNMO precursor materials both in the form of hydroxides and carbonates.

The idea underlying the present invention is to precipitate the compound $Ni_yMn_{2-y}(CO_3)_2$, where $0 \leq y \leq 0.5$, preferably spherical $Ni_yMn_{2-y}(CO_3)_2$ and most preferably spherical and dense $Ni_yMn_{2-y}(CO_3)_2$, without the use of any chelating agent.

Surprisingly and unexpectedly, exclusion of the chelating agent does not affect the powder properties (i.e. the morphology, the tap density, the particle size distribution, the BET surface area and the powder transport properties).

In Shunmugasundaram et al. (Abstract No. 808, Honolulu PRiME 2012), mixed metal carbonates such as $Ni_xMn_{1-x}CO_3$ have been synthesized from sulfate starting materials without the use of a chelating agent. However, the particles obtained according to the method display a very poor morphology. Furthermore, the precipitation was carried out at a constant pH of 7, which suggests a significant fraction of $Ni^{2+}$ ions remained in the supernatant solution.

In *J. of Alloys and Compounds,* 598 (2014) pp 73-78, a simplified co-precipitation method for the synthesis of LNMO spinel is described. The method uses elevated pressures (an autoclave system) to prepare carbonate precursors from nitrate starting materials without pH control and without adding ammonia as chelating agent. However, the process is complicated and time-consuming, because following precipitation, the precipitate needs to be aged for 10 hours in an autoclave at 80° C. The process has further only been demonstrated for the specific case of $Ni_{0.5}Mn_{1.5}(CO_3)_2$.

Thus, the present invention provides a method for the precipitation of $Ni_yMn_{2-y}(CO_3)_2$, where $0 \leq y \leq 0.5$, especially spherical $Ni_yMn_{2-y}(CO_3)_2$, by a synthesis, wherein sulfates or nitrates of nickel and manganese are mixed with sodium carbonate or potassium carbonate or mixtures of sodium carbonate and sodium hydroxide or mixtures of potassium carbonate and potassium hydroxide in a stirred reactor without using a chelating agent, thereby forming agglomerated particles. Some oxidation of the precursor can occur in the process if there is access to oxygen. This does not alter the properties of the precursor with respect to subsequent process steps as long as the change in metal concentration (wt %) in the precursor is taken into account.

During precipitation, the agglomerated particles are subjected to growth and polishing in a stirred reactor to obtain particles of desired morphology and size.

In an embodiment of the method of the invention, the aqueous solutions comprising sulfates of nickel and manganese or aqueous solutions comprising nitrates of nickel and manganese are contained in a first vessel, and the aqueous solutions of sodium carbonate or potassium carbonate or mixtures of sodium carbonate and sodium hydroxide or mixtures of potassium carbonate and potassium hydroxide are contained in a second vessel, and the mixing of the above solutions takes place in a third vessel, such as a stirred reactor. This provides a controlled precipitation of the metal carbonate particles. Preferably the flow rates of the solutions into the stirred reactor as well as the stirring speed (rpm) within the stirred reactor are chosen so as to ensure that the metal carbonate particles precipitate in a controlled manner to the desired size and shape. For example, the solutions from the first and second vessel may be added dropwise into the third vessel, viz. the stirred reactor.

It is generally accepted that the powder properties of a battery material are essential for preparing a high quality battery with optimal performance. It is further known to those skilled in the art that the preparation of spherical LNMO precursors with uniform size is a first step towards obtaining a powder of uniform size and spherical morphology, where the lithium transport distances are equal in each particle and where stresses during charging and discharging in particles are thus minimized. The shape and size of the powder particles of the final active material are to a great extent determined by the morphology and size of the precursor particles.

The invention is described further in the examples which follow.

EXAMPLE 1 (COMPARATIVE EXAMPLE)

A metal ion solution of $NiSO_4$ and $MnSO_4$ with a Ni:Mn atomic ratio of 1:3 was prepared by dissolving 258 g of $NiSO_4 \cdot 7H_2O$ and 521 g of $MnSO_4 \cdot H_2O$ in 1775 g water. In a separate flask, a carbonate solution was prepared by dissolving 2862 g of $Na_2CO_3 \cdot 10H_2O$ and 68 g $NH_3 \cdot H_2O$ in 2995 g water. The metal ion solution and the carbonate solution are added separately into a reactor provided with vigorous stirring (650 rpm) and a temperature of 50° C. The volume of the reactor was 1 liter.

The product was continuously removed from the reactor, so that the residence time of the reactants in the reactor was 30 minutes. FIG. 1 shows $Ni_{0.5}Mn_{1.5}(CO_3)_2$ particles made by using this method.

EXAMPLE 2

A metal ion solution of $NiSO_4$ and $MnSO_4$ with a Ni:Mn atomic ratio of 1:3 was prepared by dissolving 258 g of $NiSO_4 \cdot 7H_2O$ and 521 g of $MnSO_4 \cdot H_2O$ in 1775 g water. In a separate flask, a carbonate solution was prepared by dissolving 424 g of $Na_2CO_3$ in 1932 g water. No ammonia or other chelating agents were used. The metal ion solution and the carbonate solution are added separately into a reactor provided with vigorous stirring (450 rpm) and a temperature of 35° C. The volume of the reactor was 1 liter.

Figure 2:
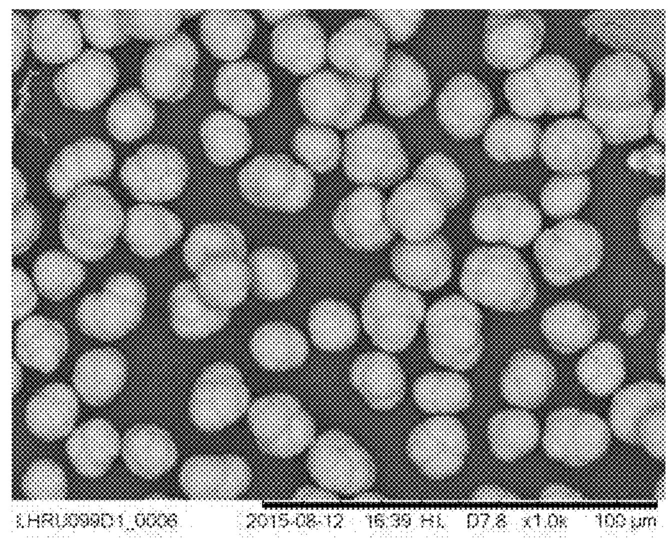
FIG. 2 shows $Ni_{0.5}Mn_{1.5}(CO_3)_2$ particles made using a method according to the disclosure.

The product was removed from the reactor after 100 minutes and divided into two. Precipitation was continued on half of the product for 60 minutes, after which it was again divided into two. This last step was repeated two more times. FIG. 2 shows $Ni_{0.5}Mn_{1.5}(CO_3)_2$ particles made by using this method.

The difference between carbonate precursor particles precipitated with and without a chelating agent can be seen in FIG. 1 and FIG. 2, showing photographs of particles made with and without a chelating agent, respectively. The particles precipitated without the use of a chelating agent look just as spherical and uniform in size (or even slightly more spherical and more uniform) than particles precipitated with the use of ammonia.

EXAMPLE 3

A metal ion solution identical to that used in Example 2 was prepared. In a separate flask, a carbonate solution was prepared by dissolving 553 g of $K_2CO_3$ in 1881 g water. No ammonia or other chelating agents were used. The metal ion solution and the carbonate solution are added separately into a reactor provided with vigorous stirring (400 rpm) and a temperature of 35° C. The volume of the reactor was 8 liters.

The product was removed from the reactor after 120 minutes and divided into two. Precipitation was continued on half of the product for 120 minutes, after which it was again divided into two. This last step was repeated two more times. The product thus obtained was collected and repeatedly and thoroughly washed on a Büchner funnel using near-boiling deionized water, until the electrical conductivity of the waste water was below 130 μS/cm. Further washing did not result in any significant further decrease in conductivity.

Figure 3:
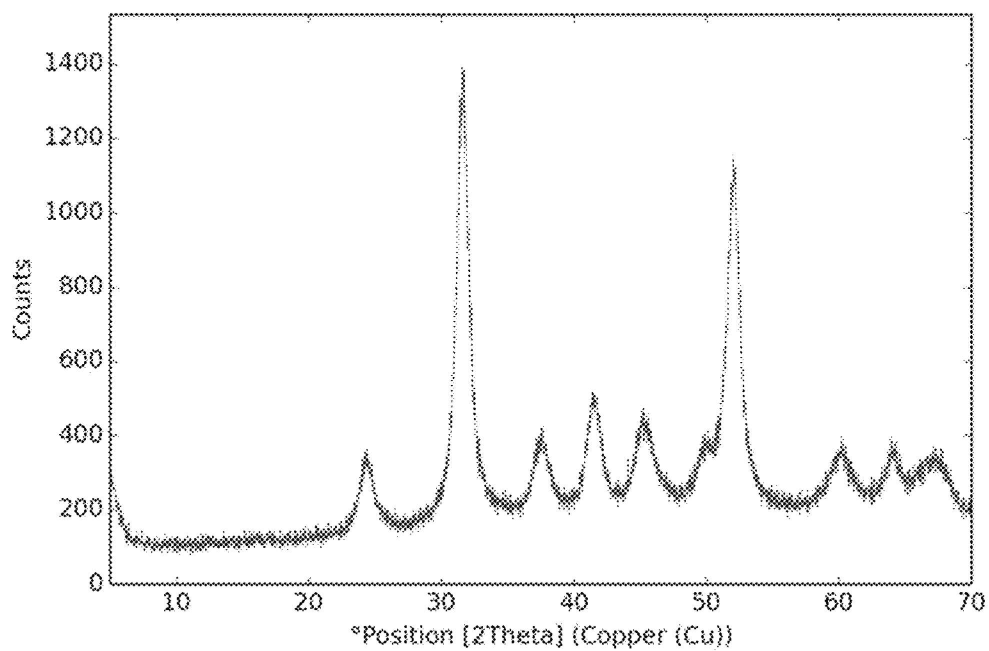
FIG. 3 shows a diffractogram corresponding to a phase composition resulting from a method according to the disclosure.

The washed and dried precursor samples were analyzed using room-temperature powder X-ray diffraction equipment using Cu $K\alpha_1$ radiation. The Rietveld refining of the obtained spectrum results in the following phase composition: 100% rhodochrosite (a=4.793 Å, b=15.549 Å), i.e. a pure metal carbonate. The corresponding diffractogram is shown in FIG. 3.

EXAMPLE 4

A metal ion solution identical to that used in Example 2 was prepared. In a separate flask, 2 liters of a carbonate solution was prepared by dissolving 368 g $K_2CO_3$ and 75 g KOH (corresponding to a molar ratio of $K_2CO_3$ to KOH of 2:1) in deionized water. The metal ion solution and the carbonate solution were added separately into a reactor provided with vigorous stirring (650 rpm) and a temperature of 36° C. The volume of the reactor was 1 liter.

The product was removed from the reactor after 100 minutes and divided into two. Precipitation was continued on half of the product for 60 minutes. The product thus obtained was collected and repeatedly and thoroughly washed on a Büchner funnel using near-boiling deionized water, until the electrical conductivity of the waste water was below 130 μS/cm. Further washing did not result in significant further decreases in conductivity.

Figure 4:
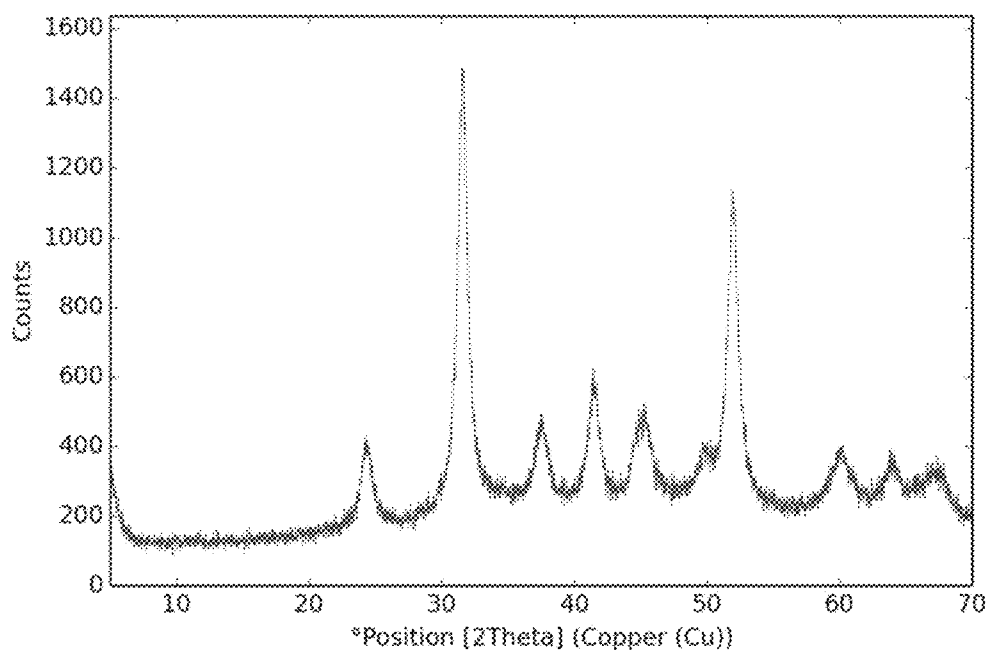
FIG. 4 shows a diffractogram corresponding to a phase composition resulting from a method according to the disclosure.

The washed and dried precursor samples were analyzed using room-temperature powder X-ray diffraction equipment using Cu $K\alpha_1$ radiation. The Rietveld refining of the obtained spectrum results in the following phase composition: 100% rhodochrosite, i.e. a pure metal carbonate. The corresponding diffractogram is shown in FIG. 4. No peaks corresponding to hydroxides or hydroxycarbonates are present in the diffractogram. Therefore, pure metal carbonate material was obtained as product, even though the carbonate solution used during precipitation was a mixture of carbonate and hydroxide.

In the four examples above, the metal ion solution and the carbonate solution were added dropwise into the stirred reactor.

It is appreciated by those skilled in the art that changes can be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A method for the precipitation of particles of a metal carbonate material comprising nickel and manganese in an atomic ratio of 0≤Ni:Mn≤1:3, wherein an aqueous solution comprising sulfates of nickel and manganese or an aqueous solution comprising nitrates of nickel and manganese is mixed with an aqueous solution of sodium carbonate or potassium carbonate or a mixture of sodium carbonate and sodium hydroxide or a mixture of potassium carbonate and potassium hydroxide in a stirred reactor at pH>7.5 without the use of a chelating agent, thereby forming agglomerated particles in one precipitation step without any subsequent process steps to change the shapes of the agglomerated particles before use of the agglomerated particles as a precursor for the preparation of a lithium-ion battery positive electrode material, wherein the agglomerated particles are characterized by an average circularity higher than 0.90 and simultaneously an average aspect ratio lower than 1.50.

2. Method according to claim 1, wherein the aqueous solution comprising sulfates of nickel and manganese or the aqueous solution comprising nitrates of nickel and manganese is contained in a first vessel, and the aqueous solution of sodium carbonate or potassium carbonate or the mixture of sodium carbonate and sodium hydroxide or the mixture of potassium carbonate and potassium hydroxide is contained in a second vessel, and the mixing thereof takes place in a stirred reactor.

3. Method according to claim 1, wherein the aqueous solution comprising sulfates of nickel and manganese or the aqueous solution comprising nitrates of nickel and manganese is mixed with the aqueous solution of sodium carbonate or potassium carbonate.

4. Method according to claim 1, wherein the agglomerated particles are essentially spherical.

5. Method according to claim 1, wherein the Ni:Mn atomic ratio in the metal carbonate material is 1/4≤Ni:Mn≤1/3.

6. Method according to claim 1, wherein the pH in the stirred reactor is 7.5<pH<12.0.

7. Method according to claim 1, wherein D50 of the precipitate is between 3 and 50 μm, where D50 of a volume-based particle size distribution is defined as the median particle size.

8. Method according to claim 7, wherein the distribution of the agglomerate size of the precipitate is characterized in that the ratio between D90 and D10 is smaller than or equal to 4, wherein D10 is the particle size where 10% of the volume of the population lies below the value of D10, and D90 is the particle size where 90% of the volume of the population lies below the value of D90.

9. Method according to claim 1, wherein the agglomerated particles are subjected to growth and polishing in a stirred reactor.

10. Method according to claim 9, where the stirred reactor comprises of two or more stirred sub-reactors connected in series.

11. Method according to claim 1, wherein the precipitate is used as a precursor for the preparation of lithium-ion battery positive electrode materials.

12. Method according to claim 1, wherein the precipitate is used as a precursor for the preparation of lithium nickel manganese oxide-type (LNMO) lithium-ion battery positive electrode materials.

13. Method according to claim 1, wherein the particles are of the formula $Ni_yMn_{2-y}(CO_3)_2$, wherein $0 \leq y \leq 0.5$.

* * * * *